(12) United States Patent
Chu et al.

(10) Patent No.: US 7,787,399 B2
(45) Date of Patent: Aug. 31, 2010

(54) AUTOMATICALLY CONFIGURING MESH GROUPS IN DATA NETWORKS

(75) Inventors: Thomas P. Chu, Englishtown, NJ (US); Ramesh Nagarajan, Princeton Junction, NJ (US); Yung-Terng Wang, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 69 days.

(21) Appl. No.: 12/179,855

(22) Filed: Jul. 25, 2008

(65) Prior Publication Data

US 2010/0020726 A1 Jan. 28, 2010

(51) Int. Cl.
 *H04L 12/28* (2006.01)
(52) U.S. Cl. .................................. 370/256
(58) Field of Classification Search ............ 370/390, 370/395, 252, 218, 236, 238, 389, 256, 254, 370/408, 469, 359, 401, 217, 219, 228; 709/204
See application file for complete search history.

(56) References Cited

U.S. PATENT DOCUMENTS

| | | | | |
|---|---|---|---|---|
| 2005/0094566 A1* | 5/2005 | Hares | ........................ | 370/238 |
| 2006/0029074 A2* | 2/2006 | Bauer | ........................ | 370/390 |
| 2009/0177744 A1* | 7/2009 | Marlow et al. | ............. | 709/204 |
| 2009/0219804 A1* | 9/2009 | Cole et al. | ................. | 370/218 |
| 2009/0232001 A1* | 9/2009 | Gong et al. | ................. | 370/236 |

OTHER PUBLICATIONS

IEEE Standard for Local and Metropolitan Area Networks: Media Access Control (MAC) Bridges, IEEE Computer Society, IEEE Std 802.1D™—2004, Jun. 24, 2004, www.standards.ieee.org [Retrieved on Apr. 29, 2008] Retrieved from Internet: URL <http://standards.ieee.org/getieee802/download/802.1D-2004.pdf> (281 pages).

RFC 1195, "Use of OSI IS-IS for Routing in TCP/IP and Dual Environments," R. Callon, Digital Equipment Corporation, Network Working Group, Dec. 1990, www.ietf.org [Retrieved on May 6, 2008] Retrieved from Internet: <URL: http://www.ietf.org/rfc/rfc1195.txt (87 pages).

RFC 2973, "IS-IS Mesh Groups," R. Balay et al., CoSine Communications, Juniper Networks, Axiowave Networks, Network Working Group, Oct. 2000, www.ietf.org [Retrieved on Apr. 24, 2008] Retrieved from Internet: <URL: http://www.ietf.org/rfc/rfc2973.txt> (8 pages).

\* cited by examiner

*Primary Examiner*—Pankaj Kumar
*Assistant Examiner*—Prenell P Jones
(74) *Attorney, Agent, or Firm*—Mendelsohn, Drucker & Associates, P.C.; Edward J. Meisarosh; Steve Mendelsohn

(57) ABSTRACT

In one embodiment, a method for setting up a flow-through mesh group (FTMG) for transmitting link-state packets (LSPs) in a network having a plurality of nodes interconnected by links. The FTMG is a combination of multiple spanning trees for the network through which LSPs are forwarded. FTMG set-up messages are received at ports of each node of the network from peer ports of linked nodes. FTMG set-up messages identify root nodes of the multiple spanning trees and the transmission modes of the peer ports. The FTMG set-up messages are used to determine (1) a root node for each spanning tree, (2) a root port on each node for each spanning tree, and (3) directionality of ports of the nodes. FTMG set-up messages are then used to determine the transmission mode of ports of the nodes and, subsequently, to update the spanning trees and transmission modes, as needed.

20 Claims, 11 Drawing Sheets

FIG. 1
PRIOR ART
100

| Field | Size |
|---|---|
| INTRA-DOMAIN ROUTING PROTOCOL DISCRIMINATOR | 1 |
| HEADER LENGTH INDICATOR | 1 |
| VERSION/PROTOCOL ID EXTENSION | 1 |
| ID LENGTH | 1 |
| R \| R \| R \| PDU TYPE | 1 |
| PDU VERSION | 1 |
| RESERVED | 1 |
| MAXIMUM AREA ADDRESSES | 1 |
| PDU LENGTH | 2 |
| REMAINING LIFETIME | 2 |
| LSP-ID | 8 |
| SEQUENCE NUMBER | 4 |
| CHECKSUM | 2 |
| P \| ATT \| ATT \| ATT \| ATT \| OL \| IS TYPE | 1 |
| TLV SECTION | 0-1465 |

101 — (header fields through PDU TYPE)
102 — REMAINING LIFETIME
103 — LSP-ID
104 — SEQUENCE NUMBER
105 — CHECKSUM
106 — TLV SECTION

SIZE IN BYTES

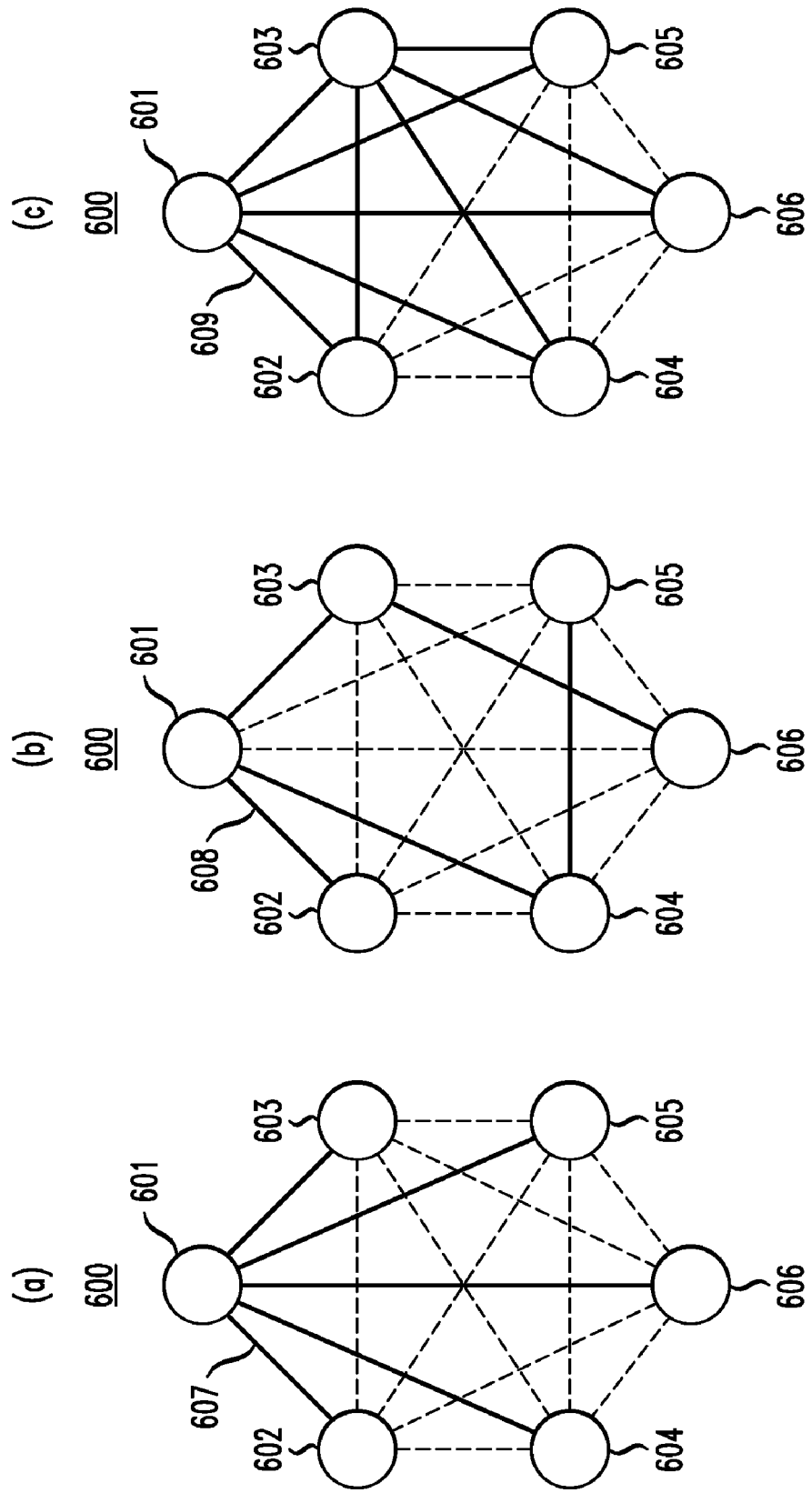

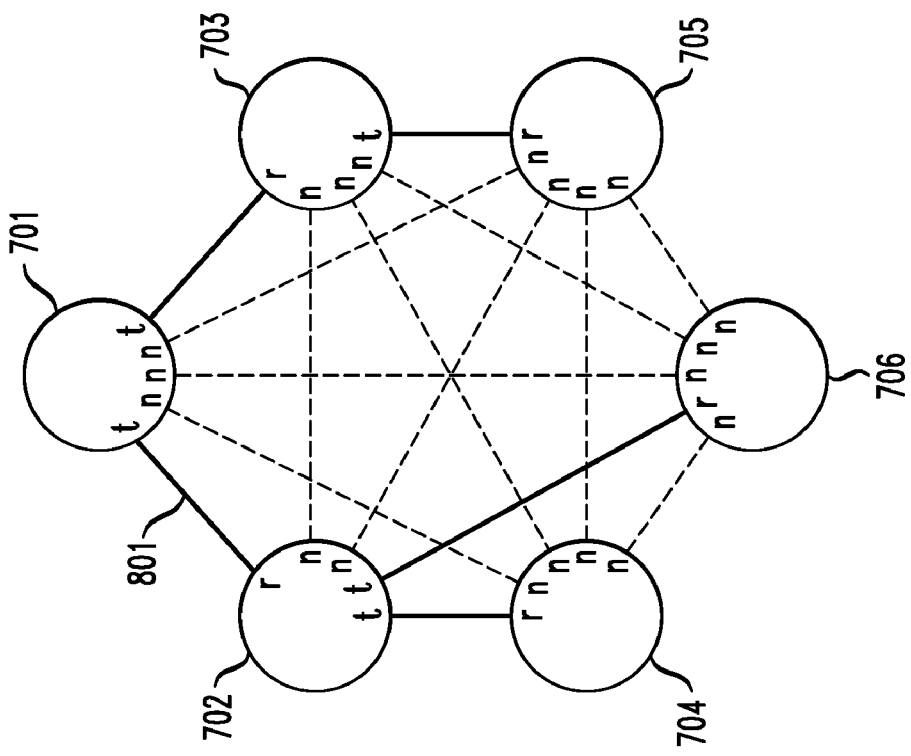
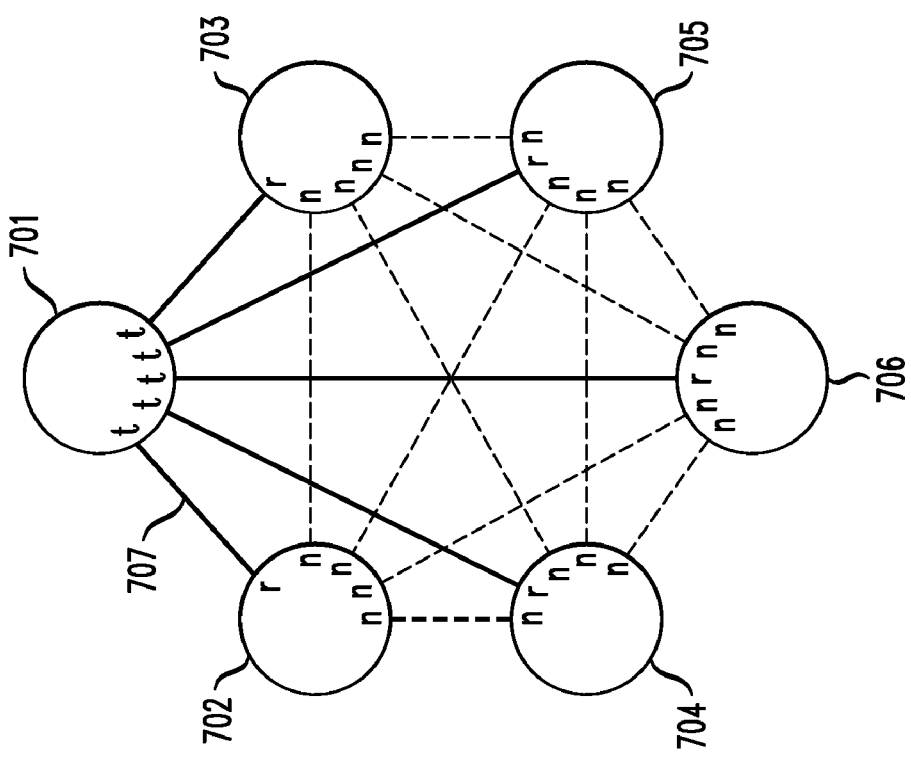

FIG. 9
900

| |
|---|
| PDU HEADER (INCLUDING PROTOCOL IDENTIFIER) ~901 |
| ORIGINATING NODE IDENTIFIER ~902 |
| ORIGINATING NODE PRIORITY ~903 |
| ORIGINATING PORT IDENTIFIER ~904 |
| ROOT IDENTIFIER ~905 |
| ROOT PRIORITY ~906 |
| ORIGINATING NODE'S PATH COST TO ROOT ~907 |
| PORT TRANSMISSION MODE ~908 |
| MESSAGE TRANSMISSION INFORMATION ~909 |

FIG. 12
1200

| Field | Ref |
|---|---|
| PDU HEADER (INCLUDING PROTOCOL IDENTIFIER) | 1201 |
| SPANNING TREES COUNT (N=2) | 1210 |
| ORIGINATING NODE IDENTIFIER | 1202 |
| ORIGINATING NODE PRIORITY | 1203 |
| ORIGINATING PORT IDENTIFIER | 1204 |
| ROOT 1 IDENTIFIER | 1205 |
| ROOT 2 IDENTIFIER | 1211 |
| ROOT 1 PRIORITY | 1206 |
| ROOT 2 PRIORITY | 1212 |
| ORIGINATING NODE'S PATH COST TO ROOT 1 | 1207 |
| ORIGINATING NODE'S PATH COST TO ROOT 2 | 1213 |
| PORT TRANSMISSION MODE 1 | 1208 |
| PORT TRANSMISSION MODE 2 | 1214 |
| MESSAGE TRANSMISSION INFORMATION | 1209 |

FIG. 11
1100

| Field | Ref |
|---|---|
| PROTOCOL IDENTIFIER | 1102 |
| PROTOCOL VERSION IDENTIFIER | |
| BPDU TYPE | |
| FLAGS | |
| ROOT IDENTIFIER | |
| ROOT PATH COST | |
| BRIDGE IDENTIFIER | |
| PORT IDENTIFIER | |
| MESSAGE AGE | |
| MAX AGE | |
| HELLO TIME | |
| FORWARD DELAY | |
| PORT TRANSMISSION MODE | 1103 |

FIG. 13
1300

| | |
|---|---|
| PDU HEADER (INCLUDING PROTOCOL IDENTIFIER) | ~ 1301 |
| SPANNING TREES COUNT (N=2) | ~ 1310 |
| ORIGINATING NODE IDENTIFIER | ~ 1302 |
| ORIGINATING NODE PRIORITY 1 | ~ 1303 |
| ORIGINATING NODE PRIORITY 2 | ~ 1315 |
| ORIGINATING PORT IDENTIFIER | ~ 1304 |
| ROOT 1 IDENTIFIER | ~ 1305 |
| ROOT 2 IDENTIFIER | ~ 1311 |
| ROOT 1 PRIORITY | ~ 1306 |
| ROOT 2 PRIORITY | ~ 1312 |
| ORIGINATING NODE'S PATH COST TO ROOT 1 | ~ 1307 |
| ORIGINATING NODE'S PATH COST TO ROOT 2 | ~ 1313 |
| PORT TRANSMISSION MODE 1 | ~ 1308 |
| PORT TRANSMISSION MODE 2 | ~ 1314 |
| MESSAGE TRANSMISSION INFORMATION | ~ 1309 |

AUTOMATICALLY CONFIGURING MESH GROUPS IN DATA NETWORKS

BACKGROUND OF THE INVENTION

1. Field of the Invention

The current invention relates to data networks, and in particular, to the automatic set-up of mesh groups in a data network.

2. Description of the Related Art

A data network enables the transport of data packets from a source end-point to a destination end-point. A typical data network comprises multiple nodes, known as routers, that route the data packets from the source to the destination. Note that a network may be defined so as to exclude from the network nodes that are nevertheless connected to the network. Thus, external nodes may be connected to nodes within the network, where the external nodes are not part of the network. Additionally, a single node may belong to more than one network. Nodes typically comprise a processor, memory, and one or more communication ports.

Data packets include destination addresses, which allow routers to determine how to forward the data packets. A typical router maintains a routing table, also known as a routing information database (RIB), to store network-topology information to allow the router to forward data packets towards the packets' corresponding destinations. Routing tables are typically updated dynamically and automatically to reflect changes in network topology and performance.

Routers in a particular data network are compatible with the particular routing protocol of that data network. A typical routing protocol includes a methodology for routers to exchange network topology information. The typical routing protocol also includes an algorithm for a router to execute for calculating a best path for routing a given data packet to a destination, where the best path is based on the contemporary topology information.

There are two major classes of routing protocols: vector protocols and link-state protocols. Examples of vector protocols include RIP (Routing Information Protocol), IGRP (Interior Gateway Routing Protocol), and EIGRP (Enhanced Interior Gateway Routing Protocol). Examples of link-state protocol include OSPF (Open Shortest Path First) and IS-IS (Intermediate System to Intermediate System). OSPF and IS-IS are currently maintained by working groups in the IETF (Internet Engineering Task Force). Link-state protocols are generally considered to be more robust and to allow faster convergence times than vector protocols, particularly in large networks. Therefore, link-state protocols are typically preferred in larger networks. OSPF is often preferred for enterprise networks, while IS-IS is often preferred for core networks, such as ISP (Internet Service Provider) backbone networks.

The IS-IS protocol can be used to support any OSI (Open System Interconnection) layer-3 protocol such as, e.g., IP (Internet Protocol) or CLNP (Connectionless Network Protocol). A description of the use of the IS-IS protocol with TCP/IP (Transfer Control Protocol/Internet Protocol) can be found in IETF RFC (Request for Comment) 1195, titled "Use of OSI IS-IS for Routing in TCP/IP and Dual Environments," incorporated herein by reference in its entirety. Among the message types supported by the IS-IS protocol are LSP (link-state packet; also link-state PDU (packet data unit)), CSNP (Complete Sequence Number PDU), and PSNP (Partial Sequence Number PDU).

An LSP contains information about the links at the LSP's originating node. A link is a (direct or virtual) connection to another node and may be identified by a communication port on the originating node and a peer communication port on the other node. Links can go up, come down, or be otherwise modified. LSPs are sent out by an originating node in order to provide information to the other nodes in a network about the condition and status of the links at the originating node. Information from received LSPs is maintained by a receiving node in the receiving node's link-state database, where each link-information entry of the link-state database corresponds to a received or generated LSP. Thus, received LSPs are used to update a receiving node's link-state database. The operating details of particular implementations of link-state databases are implementation-specific and may vary.

FIG. 1 shows the format of typical LSP 100, with field sizes in bytes appearing on the right side. LSP 100 includes PDU-type field 101, remaining-lifetime field 102, LSP-ID field 103, sequence-number field 104, checksum field 105, and TLV (tag-length-value) section 106. PDU-type field 101 identifies the PDU as an LSP. Remaining-lifetime field 102 specifies the length of time that the information in LSP 100 should be considered valid. LSP-ID field 103 identifies the originating node of the LSP. Sequence number 104 identifies the sequential number of the LSP from the LSP-originating node. LSP-originating nodes increment the sequence number for generated LSPs having new information to alert receiving nodes that corresponding link-state database information should be updated. Nodes may re-send LSPs with unchanged information in response to requests, as refreshers, or for other reasons. Thus, an LSP-originating node may generate multiple, substantially identical LSPs even if that node has no new link-state information to report. Checksum 105 is a checksum value used to determine if there are transmission errors in LSP 100. TLV section 106 is the payload of LSP 100 and may contain a variety of parameters, each identified by a parameter tag, a parameter length, and a parameter value.

A CSNP contains a listing and summary of all the LSPs maintained in the link-state database of the CSNP-originating node. CSNPs are used to synchronize the link-state databases of neighboring network nodes. A summary entry for an LSP in a CSNP includes the remaining lifetime, the LSP-ID, the sequence number, and the checksum. Based on these parameters, a CSNP-receiving node can determine whether synchronization of information is necessary, in which case the nodes can synchronize by the transmission of the appropriate LSP(s). A complete summary of a link-state database may be divided and sent over multiple CSNPs if a single CSNP packet is not sufficiently large to accommodate the complete summary. A PSNP contains a listing and summary of a subset of the LSPs in the link-state database of the PSNP-originating node. PSNPs are used to acknowledge receipt of one or more LSPs and to request one or more LSPs from a neighboring node.

IS-IS nodes distribute LSPs by flooding. When a node determines that the status of one or more of its links has changed, it generates a corresponding LSP and sends it to all the nodes to which it is linked on the network (i.e., the node's neighbors). When a node receives an LSP from a sending node, the receiving node compares the LSP's LSP-ID and sequence number to the LSP-ID and sequence number in the receiving-node's link-state database. If the LSP-ID is not stored in the link-state database, then the receiving node adds the information of the received LSP to the receiving node's link-state database. The receiving node then forwards the LSP to all its neighbors, except the sending node. If the LSP-ID is already in the receiving node's link-state database and the sequence number of the received LSP is the same as the stored sequence number for the corresponding LSP-ID, then the receiving node determines that the LSP contains no new information and ignores the LSP.

If the sequence number of the received LSP is higher than the stored sequence number for the corresponding LSP-ID, then the receiving node determines that the LSP contains new information and (i) updates its link-state database based on the received LSP and (ii) forwards the LSP to all the nodes to which it is linked, other than the node which sent the receiving node the LSP. If the sequence number of the received LSP is lower than the stored sequence number for the corresponding LSP-ID, then the receiving node determines that the sending node's link-state database needs updating, and the receiving node sends its stored LSP information for the corresponding LSP-ID (with the higher sequence number) from its link-state database to the sending node. This flooding process helps guarantee that new LSPs are distributed to all the nodes in a network so that all those nodes have up-to-date link-state information.

FIG. 2 shows an illustration of exemplary LSP flooding in fully connected network 200. A fully connected network is a network whose nodes have links to all the other nodes in the network. Note that these links can be virtual (a.k.a. logical) connections and do not have to be direct (a.k.a. physical) connections. Similarly, a highly connected network is a network where most of the nodes have links to most of the other nodes in the network. Network 200 comprises interconnected nodes 201, 202, 203, 204, 205, and 206. In step 1 of FIG. 2(a), node 201 originates a new LSP and forwards it to all the nodes to which it is linked, i.e., nodes 202, 203, 204, 205, and 206. In step 2 of FIG. 2(b), each of nodes 202, 203, 204, 205, and 206 forwards the LSP to every node to which it is linked, other than the node from which it received the LSP. Thus, each of nodes 202, 203, 204, 205, and 206 forwards the LSP to four other nodes (e.g., node 206 forwards the LSP to nodes 202, 203, 204, and 205). In effect, each of nodes 202, 203, 204, 205, and 206 receives and processes the same LSP five times. Note that, when a node (e.g., 202, 203, 204, 205, and 206) receives subsequent copies of the same LSP, the node will not forward the LSP again.

Flooding in a fully or highly connected network can become a growing concern as the number of nodes increases. For example, if a node in a fully connected network of 300 nodes originates a new LSP, then every other node in that network will receive and process 299 copies of that LSP—one from the originating node, and one from each of the 298 other nodes in the network. Processing that many LSPs can noticeably degrade the performance of a node. Even more problematic is the situation where one of the 300 nodes fails. When a node fails, its neighbors detect that their respective connecting links to the failed node are not operating. Upon the detection of the respective link failure, each of the failed node's 299 neighbors originates an LSP to forward to the 298 other nodes indicating that the respective link to the failed node has failed. Each LSP will be flooded through the network as per the algorithm outlined above. Thus, when the one node fails, each of the other nodes will receive close to 90,000 LSPs (~298*298). Trying to process that many LSPs in a short period can put a serious, or even debilitating, strain on a node's processor.

As noted above, a fully connected network can be formed even where each individual node does not have direct (i.e., intermediary-free, physical-layer) connections to all the other nodes. In other words, nodes in a fully connected network can be linked through virtual connections. Two nodes in a network are virtually connected at a logical layer when the two nodes are physically connected via one or more intermediary nodes, where the logical layer is unaware of the physical connections involving the one or more intermediary nodes. For example, MPLS (Multi-Protocol Label Switching) is a protocol-independent packet-forwarding OSI layer-2 technology (sometimes considered a layer-2.5 technology) that allows for the rapid and direct-seeming transmission of layer-3 (e.g., IP) packets between MPLS nodes. This is accomplished partly by pushing labels onto layer-3 (e.g., IP) packets and using the labels to quickly route the resultant MPLS packets. In an optical network, particular wavelengths can be used as labels for protocol-independent packet forwarding.

FIG. 3 shows one possible physical implementation of fully connected network 200 of FIG. 2. Path 201a physically connects nodes 201 and 203. Paths 203a, 205a, 206a, 204a, and 202a physically connect (i) nodes 203 and 205, (ii) nodes 205 and 206, (iii) nodes 206 and 204, (iv) nodes 204 and 202, and (v) nodes 202 and 201, respectively. Using a protocol-independent packet-forwarding technology, such as MPLS, virtual or logical connections can be established among the nodes of network 200 which would appear as links to layer-3 network systems. Thus, to IP network 200, the six nodes appear fully connected. For example, node 201 would be able to transmit an LSP to node 206 where the LSP would be physically transmitted via nodes 203 and 205, but without any processing, or even awareness, by layer-3 network systems on nodes 203 and 205.

As noted above, flooding messages in a highly connected network can put a deleterious strain on system performance. One proposal to mitigate the problem is the establishment of mesh groups as presented in RFC 2973, titled "IS-IS Mesh Groups," incorporated herein by reference in its entirety. A mesh group is a group of connections among nodes, where the connections are administratively configured to belong to a particular group. A mesh group can be used to avoid flooding LSP packets by forwarding LSPs only on a subset of ports, instead of substantially all of a node's ports. Limiting the number of LSP packets sent out by a node reduces the detrimental effects of flooding. It should be noted that mesh-group limitations apply to the distribution of LSP packets. Link-state-limited links remain fully active and available for the transmission of bearer or other types of packets.

The mesh groups described in RFC 2973 can be set up by setting the links in the network to one of three settings: meshBlocked, meshInactive, or meshSet. By default, links are in the meshInactive state, where the ports defining the links behave as though mesh groups have not been set up. When a node receives an LSP from a meshInactive link, the node forwards the LSP via all other links which are not in a meshBlocked state. A node will forward any received LSPs via all other meshInactive links. Original LSPs will be transmitted via all meshInactive links. No LSPs are forwarded via meshBlocked links. No LSPs should come in from a meshBlocked link since the corresponding node should not forward LSPs via the meshBlocked link. Links in the meshSet state have an associated parameter, meshGroup, which identifies a corresponding mesh group. If a node receives an LSP from a meshSet link, then the node will forward the LSP via all the meshInactive links and on meshSet links that have a meshGroup parameter different from the meshGroup parameter of the ingress link. For example, if a node receives an LSP from a meshSet ingress link whose meshGroup is 1, then it will not forward the LSP via any meshSet links whose meshGroup is 1. MeshSet meshGroups are complicated and not often used.

FIG. 4 shows an illustration of an exemplary operation of a mesh group in network 400 in accordance with RFC 2973. Network 400 comprises interconnected nodes 401, 402, 403, 404, 405, and 406. The FIG. 4 links in bold belong to mesh- Group 1, while the dashed links belong to meshGroup 2. No links in network 400 are in the meshBlocked or meshInactive state. If node 401 generates an LSP, then, as illustrated in step 1 of FIG. 4(a), node 401 forwards the LSP on all of its links. The other nodes then forward the LSP received from node 401 via links that belong to meshGroups (1) different from the meshGroup of the ingress link and (2) that did not already transmit that LSP. Node 404, for example, received the LSP from node 401 via a group-2 link, and forwards the LSP via its group-1 links to nodes 402 and 406. After step 2 of FIG. 4(b), the flooding of network 400 is complete because every node has sent or received the LSP via every meshGroup through which it is linked. As can be seen, because of the mesh groups in network 400, fewer LSPs are transmitted and processed in network 400 than in network 200 of FIG. 2.

RFC 2973 also describes another use of mesh group parameters sometimes called "poor man's mesh groups," herein referred to as flow-through mesh groups (FTMGs). In a flow-through mesh group, the meshSet state is not used. Instead, certain links are set to meshBlocked to prune the flooding topology. This creates a group of links through which LSPs flow.

FIG. 5 shows an illustration of an exemplary operation of a flow-through mesh group in network 500. Network 500 comprises six interlinked nodes 501-506. The links in bold are set to meshInactive and belong to flow-through mesh group 507. The dashed links are set to meshBlocked. If node 501 generates an LSP, then, as shown in step 1 of FIG. 5(a), node 501 forwards the LSP via its meshInactive ports to nodes 502 and 503. Then, as shown in step 2 of FIG. 5(b), nodes 502 and 503 forward the LSP via their meshInactive ports, other than the ingress ports, to nodes 504 and 505, respectively. Nodes 504 and 505 similarly then each forward the LSP via their meshInactive ports, other than the ingress ports, to node 506, as shown in step 3 of FIG. 5(c). After step 3, the flooding of network 500 is complete. As can be seen, because of flow-through mesh group 507 in network 500, fewer LSPs are transmitted and processed in network 500 than in network 400 of FIG. 4. However, the LSP-update system of network 500 is less robust than that of both network 200 of FIG. 2 and network 400 of FIG. 4, because, if any two links of flow-through mesh group 507 fail, then at least one node will no longer get LSPs from the other nodes.

The mesh groups proposed by RFC 2973 need to be manually designed and implemented by the network administrator. Subsequent maintenance of the mesh groups is also performed manually by the network administrator. The prior-art systems are prone to set-up errors and to slow reactions to network problems and/or evolving network requirements.

SUMMARY OF THE INVENTION

One embodiment of the invention can be a first node for a network comprising a plurality of nodes interconnected by a plurality of links, the plurality of nodes comprising the first node. The first node is adapted to be part of a flow-through mesh group (FTMG) including the plurality of nodes of the network and a subset of the plurality of links of the network, wherein at least one link of the network is not part of the flow-through mesh group. Each node of the network comprises one or more ports. Each port is adapted to connect via a link to a peer port at an other node of the network. Each port has a first transmission mode. The first transmission mode is one of transmitting mode and non-transmitting mode. The first node is adapted to receive, at a first port of the first node, an FTMG set-up message from the first port's peer port, wherein the FTMG set-up message identifies a root node of a first spanning tree for the network and the first transmission mode of the peer port. The first node is further adapted to set the first transmission mode of the first port based on at least one of (i) the identified first transmission mode of the peer port and (ii) the identified root node of the first spanning tree.

Another embodiment of the invention can be a computer-implemented method for a first node in a network. The network comprises a plurality of nodes interconnected by a plurality of links. The plurality of nodes comprises the first node. The first node is adapted to be part of a flow-through mesh group (FTMG) including the plurality of nodes of the network and a subset of the plurality of links of the network, wherein at least one link of the network is not part of the flow-through mesh group. Each node of the network comprises one or more ports. Each port is adapted to connect via a link to a peer port at an other node of the network. Each port has a first transmission mode. The first transmission mode is one of transmitting mode and non-transmitting mode. The method comprises receiving, at a first port of the first node, an FTMG set-up message from the first port's peer port, wherein the FTMG set-up message identifies a root node of a first spanning tree for the network and the first transmission mode of the peer port. The method further comprises setting the first transmission mode of the first port based on at least one of (i) the identified first transmission mode of the peer port and (ii) the identified root node of the first spanning tree.

Yet another embodiment of the invention can be a machine-readable medium, having encoded thereon program code for a first node of a network. The network comprises a plurality of nodes interconnected by a plurality of links. The plurality of nodes comprises the first node. The first node is adapted to be part of a flow-through mesh group (FTMG) including the plurality of nodes of the network and a subset of the plurality of links of the network, wherein at least one link of the network is not part of the flow-through mesh group. Each node of the network comprises one or more ports. Each port is adapted to connect via a link to a peer port at an other node of the network. Each port has a first transmission mode. The first transmission mode is one of transmitting mode and non-transmitting mode. When the program code is executed by a machine, the machine implements a method comprising the steps of (1) receiving, at a first port of the first node, an FTMG set-up message from the first port's peer port, wherein the FTMG set-up message identifies a root node of a first spanning tree for the network and the first transmission mode of the peer port and (2) setting the first transmission mode of the first port based on at least one of (i) the identified first transmission mode of the peer port and (ii) the identified root node of the first spanning tree.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 1 shows the structure of a typical link-state packet (LSP).

FIG. 6 shows various exemplary flow-through mesh groups.

FIG. 7 shows an exemplary fully-connected network.

FIG. 8 shows the network of FIG. 7 with an exemplary flow-through mesh group and spanning tree.

FIG. 9 shows the structure of an exemplary flow-through mesh group set-up (FTMGS) message in accordance with an embodiment of the present invention.

FIG. 11 shows the structure of an exemplary customized bridge protocol data unit (BPDU) in accordance with an embodiment in accordance with an embodiment of the present invention.

FIG. 12 shows the structure of an exemplary FTMGS message for a 2-spanning-tree FTMG in integrated mode in accordance with an embodiment of the present invention.

FIG. 13 shows the structure of an exemplary FTMGS message for a 2-spanning-tree FTMG in independent mode in accordance with an embodiment of the present invention.

DETAILED DESCRIPTION

Figure 2:
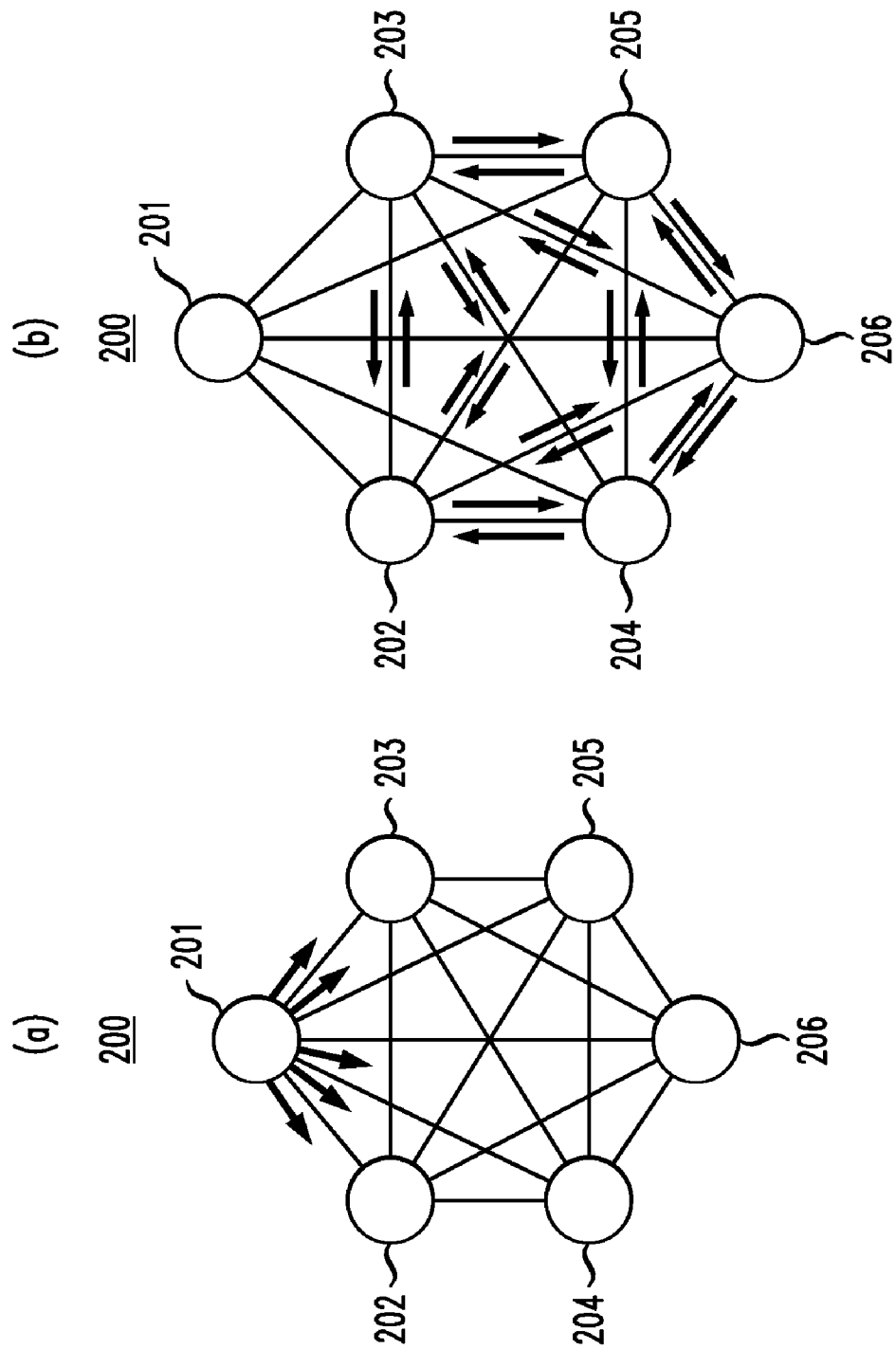
FIG. 2 shows an illustration of exemplary LSP flooding in a fully connected network.
Figure 4:
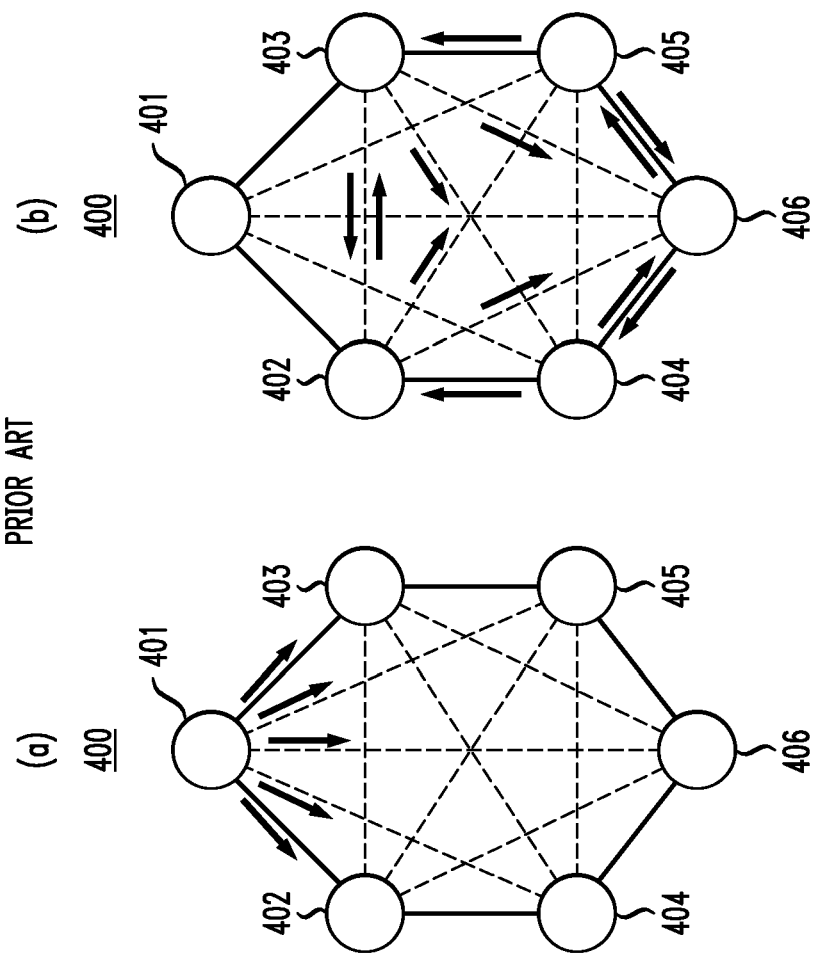
FIG. 4 shows an illustration of an exemplary operation of a mesh group in a network in accordance with RFC 2973.
Figure 3:
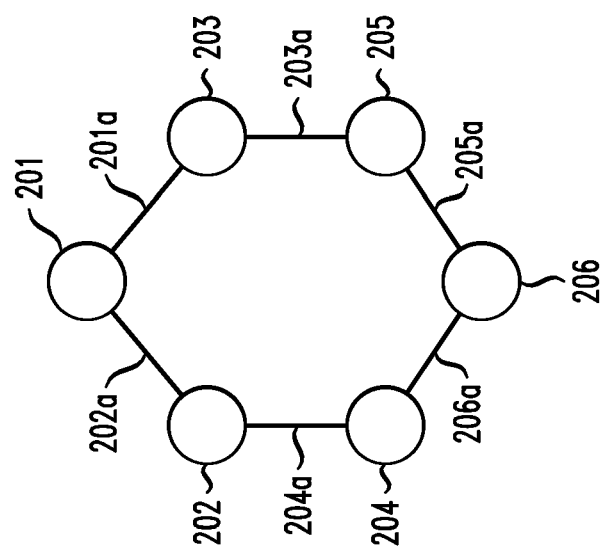
FIG. 3 shows a possible physical implementation of the fully connected network of FIG. 2.
Figure 5:
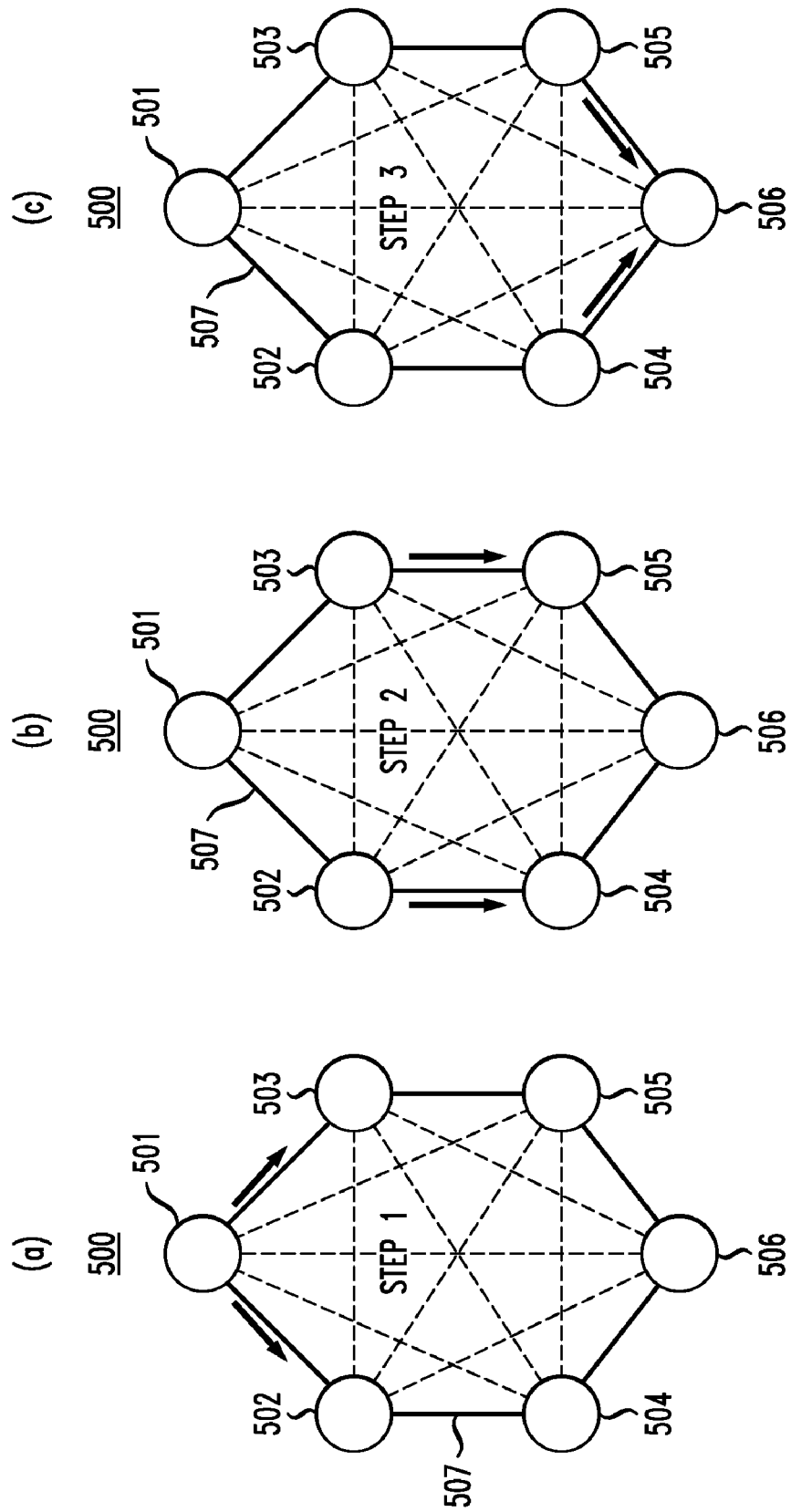
FIG. 5 shows an illustration of an exemplary operation of a flow-through mesh group in a network.

Flow-through mesh groups may be set up in the form of a collection of one or more spanning trees. A spanning tree is a set of links that connects the nodes in the network without having link loops. A spanning tree is considered an efficient way to connect nodes in a network.

FIG. 6(*a*) shows spanning tree 607 in network 600, which comprises interconnected nodes 601-606. Spanning tree 607 consists of the five links, indicated in bold, from node 601 to nodes 602-606. Spanning tree 607 is in the form of a reflector network, where one node, called the reflector node, is linked to all the other nodes. Node 601 is the reflector node of spanning tree 607. In addition, assuming that node priority level correlates to node label, where a lower number indicates a higher priority level, node 601 is also the root of spanning tree 607. It should be noted, however, that the root node and the reflector node of a spanning tree do not have to be the same node.

FIG. 6(*b*) shows spanning tree 608 in network 600. Spanning tree 608 consists of the links indicated in bold in FIG. 6(*b*), specifically, the following links: 601-602, 601-603, 601-604, 604-605, and 603-606. Node 601 is the root of spanning tree 608. Since spanning tree 608 is not a reflector network, spanning tree 608 does not have a reflector node.

FIG. 6(*c*) shows flow-through mesh group 609 in network 600. Flow-through mesh group 609 consists of the links indicated in bold in FIG. 6(*c*). Flow-through mesh group 609 is not in the form of a spanning tree, since it has link loops, such as the 601-603-605-601 loop. Flow-through mesh group 609 is, however, the combination of two reflector spanning trees, one with a reflector at node 601 and the other with a reflector at node 603.

In one embodiment of the present invention, a flow-through mesh group is automatically and dynamically created in a network comprising a plurality of nodes. This flow-through mesh group is generated in the form of a spanning tree. It should be noted again that, unless otherwise indicated, the transmission characteristics of ports (e.g., whether a port is in transmitting or non-transmitting mode) herein refers to the transmission of LSPs, CSNPs, and PSNPs, but generally not to other network traffic, such as bearer packets (i.e., the links remain active for the transmission of bearer packets).

FIG. 7 shows exemplary fully-connected network 700 comprising interconnected nodes 701, 702, 703, 704, 705, and 706. Initially, before any flow-through mesh group is set up, each node is not fully aware of the other nodes in network 700, and each port is in transmitting mode. The nodes exchange flow-through mesh group set-up (FTMGS) messages to determine which nodes are in network 700 and which of those nodes should be the root node of a spanning tree. Initially, each node assumes that it is the root node. The root node is chosen based on comparisons of designated priorities and/or node identification numbers. Assuming nodes 701-706 have the same designated priority and that a node's identification number matches the node's label in FIG. 7, then node 701, having the lowest identification number, is chosen as the root node. Every other node then chooses the least-cost path from that node to root node 701. Path cost can be calculated based on any path-cost algorithm now known or later developed. If path cost is equal to the number of link hops, then, for each node, the least-cost path is the link to root node 701. The port that connects to the least-cost path to the root is designated a root port, labeled with an "r" in FIG. 7, where the links from the root ports to corresponding ports in the root node are indicated in bold. Together, the bold links form flow-through mesh group and spanning tree 707.

The default mode for ports is transmitting. Root ports are in transmitting mode. Every node of flow-through mesh group 707 determines whether the node's non-root ports should stay in transmitting mode or change to non-transmitting mode. Transmitting ports behave like meshInactive ports, while non-transmitting ports behave like meshBlocked ports. For each active non-root port, i.e., a non-root port connected to a peer port on the network, the directionality of the port and its corresponding link is determined—i.e., whether that non-root port is the upstream or downstream port of the link in relation to the peer port. The upstream designation goes to the port that belongs to the node that has the lower path cost to the root. If both nodes have the same path cost to the root, then the port of the node having the higher designated priority level is designated as the upstream port. If both nodes have the same path cost to the root and the same designated priority, then the port of the node having the lower node-identification number is designated as the upstream port. In FIG. 7, root ports are downstream ports in transmitting mode. Non-root transmitting ports, labeled with a "t" in FIG. 7, are upstream ports in transmitting mode. Non-transmitting ports, labeled with an "n" in FIG. 7, are in non-transmitting mode and can be upstream or downstream.

A downstream port that is not a root port gets set to be in a non-transmitting mode. An upstream port determines its setting based on its peer downstream port. If the downstream port is a root port, then the upstream port is transmitting. If the downstream port is non-transmitting, then the upstream port gets set to non-transmitting. The nodes of network 700 continue to exchange FTMGS messages at particular intervals so that flow-through mesh group 707 can re-form and its nodes can change their port settings if network conditions make changes necessary. If, for example, path cost were based on available bandwidth, and the available bandwidth of links 701-704, 701-706, and 701-705 decreased significantly, then their path costs would increase significantly and a different spanning tree, and consequently, a different flow-through mesh group, may result.

FIG. 8 shows network 700 of FIG. 7 with flow-through mesh group and spanning tree 801. Flow-through mesh group 801 consists of the links in bold in FIG. 8. Flow-through mesh group 801 is one possible result of the link-bandwidth decreases (and consequent path-cost increases) described above. FIG. 8 shows that two of node 702's non-root ports are in transmitting mode because their peers in nodes 704 and 706 are now root ports. One of node 703's non-root ports is in transmitting mode because its peer in node 705 is now a root port. Three of root node 701's ports are now in non-transmitting mode because their peers are now non-transmitting non-root ports.

FIG. 9 shows the structure of exemplary FTMGS message 900, which is for a one-spanning-tree flow-through mesh group. Message 900 comprises several fields, such as PDU header 901, which identifies message 900 as an FTMGS message. Originating node identifier 902 identifies the node that originates message 900. Originating node priority field 903 indicates the designated priority level of the originating node. Originating port identifier 904 identifies the particular port of the originating node through which message 900 is sent. Root identifier 905 indicates which node is believed to be the root by the originating node. Root priority field 906 indicates the designated priority level of the purported root node. Originating node's path cost to root field 907 holds the cost of the path from the originating node to the purported root node, as determined by the originating node. Port transmission mode 908 indicates the transmission mode of the originating port, i.e., whether the originating port is in transmitting or non-transmitting mode. Message transmission information field 909 includes information that can be used to determine whether message 900 should be considered expired or not.

Figure 10:
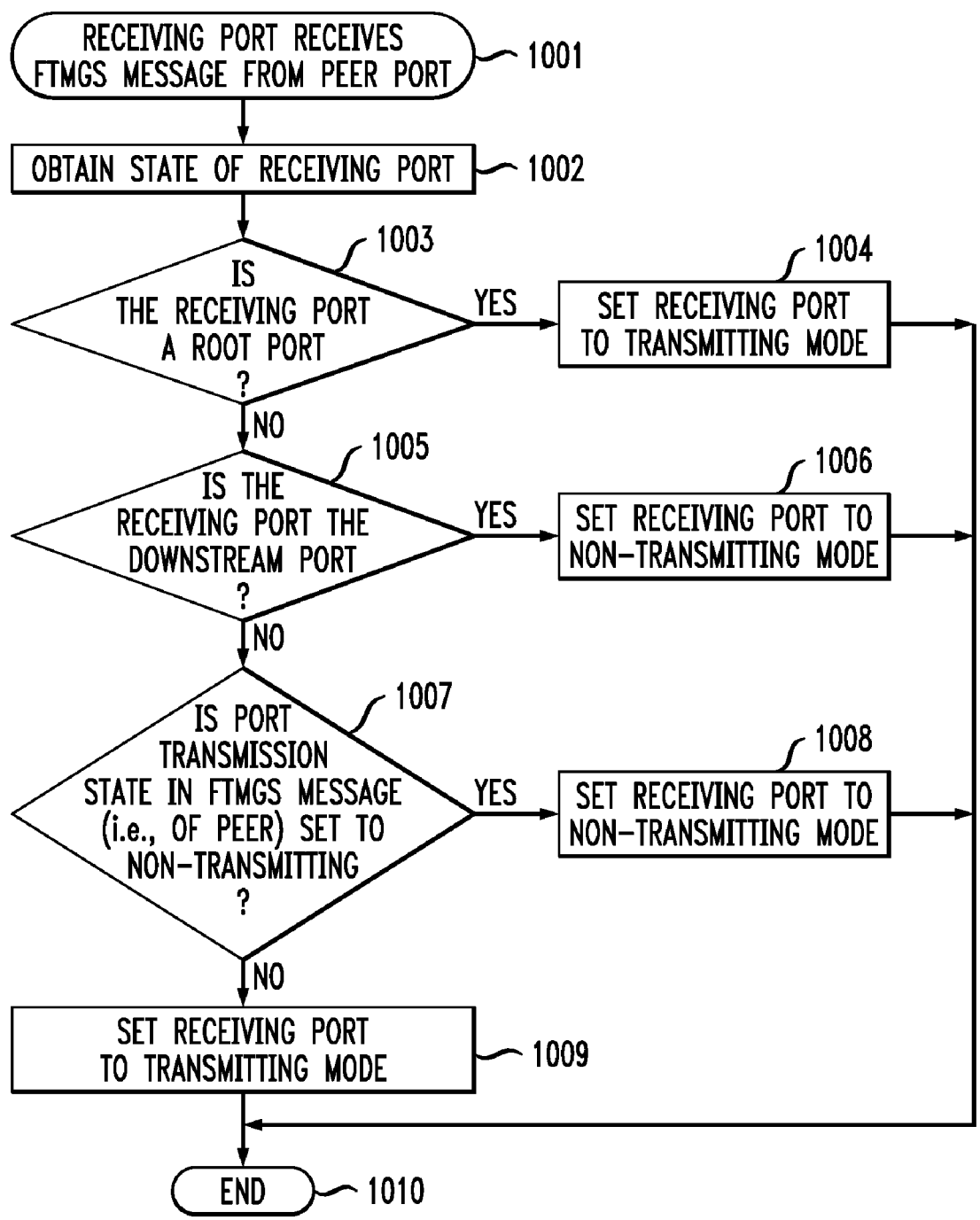
FIG. 10 shows an exemplary flowchart for the processing of a received FTMGS message by a receiving port in accordance with an embodiment of the present invention.

FIG. 10 shows exemplary flowchart 1000 for the processing of a received FTMGS message by a receiving port. The procedure starts when the receiving port of a receiving node receives an FTMGS message from a peer port (step 1001). The receiving node processes the FTMGS and determines the transmission characteristics of the receiving port—e.g., (i) transmitting or non-transmitting, (ii) root or non-root, and (iii) upstream or downstream (step 1002). If the receiving port is a root port (step 1003), then the receiving port is set to transmitting mode (step 1004), and the process terminates (step 1010). If the receiving port is not a root port (step 1003), then it is determined whether it is the upstream or downstream port (step 1005). If the receiving port is the downstream port (step 1005), then the receiving port is set to non-transmitting mode (step 1006) and the process ends (step 1010). If the receiving port is not the downstream port (i.e., it is the upstream port) (step 1005), then it is determined whether the transmission mode field in the received FTMGS message (i.e., of the downstream peer port) is set to non-transmitting (step 1007). If the transmission mode field in the received FTMGS is set to non-transmitting (step 1007), then the receiving port is set to non-transmitting mode (step 1008), and the process ends (step 1010). If the transmission mode field in the received FTMGS is set to transmitting (step 1007), then the receiving port is set to transmitting mode (step 1009), and the process ends (step 1010).

In another embodiment of the present invention, the flow-through mesh group set-up messages are modified bridge protocol data units (BPDUs), and their processing is a modified version of BPDU processing. BPDUs are used in the spanning-tree protocol for bridges as defined in IEEE standard 802.1D, incorporated herein by reference in its entirety. The 802.1D spanning tree protocol is used in layer-2 bridged networks. Bridges are used to connect various LAN (local area network) segments to behave like a single LAN. LAN segments can comprise point-to-point links and multiple-access media such as an Ethernet.

In the 802.1D spanning-tree protocol, bridges are assigned a priority level administratively. If two bridges have the same priority level, then bridge ID is used as the tie breaker, where the bridge with the lower ID has the higher priority. The bridge with the highest priority in a network becomes the root of a corresponding spanning tree of that network. Each bridge will periodically send configuration BPDUs to its neighbors to set up and maintain the spanning tree. A configuration BPDU contains a number of parameters including: (i) the bridge ID of the bridge sending the configuration BPDU (sender), (ii) the port ID of the port sending the configuration BPDU, (iii) the ID of the bridge that the sender currently considers to be the root node of the network, and (iv) the path cost from the sender to that root.

For example, take a network including two bridges, A and B, connected by a link L, where the connecting ports are P1 at A and P2 at B. Suppose that initially bridge A considers node R1 to be the root, while bridge B considers node R2 to be the root. After exchanging configuration BPDUs, both A and B will select, from between nodes R1 and R2, the node with the higher priority as the root. Through similar exchanges throughout the network, all the network's bridges will eventually agree on the identity of the root node, which has the highest priority in the network. After agreeing on a root, bridges A and B will determine which one is the upstream bridge over link L. The upstream node is the node that is closer to the root in terms of path cost. If there is a tie in path cost, then the higher-priority node of A and B becomes the upstream node. Supposing this is A, then the port at the upstream node, P1 at A in this case, is referred to as the designated port of link L. Consequently, node A, the upstream node, is referred to as the designated bridge.

Recall that, in the 802.1D spanning-tree protocol, a link can be a point-to-point link or an Ethernet. In the Ethernet case, multiple bridges can be connected to the same Ethernet. The logic described above can be used to select the upstream node and designated port among all the connected bridges on an Ethernet. One and only one bridge (port) will be selected as the upstream bridge (designated port). Designated ports will be in the forwarding state in that they always forward all traffic packets they receive.

A bridge may have a number of non-designated ports. A bridge will select the non-designated port with the lowest path-cost to the root as the root port. The root port is the port that the bridge will use to forward packets upstream towards the root. The non-designated and non-root ports are put in the "blocked" state in that they will not accept and forward traffic packets through the port. Note that BDPU packets, which are sent between neighboring nodes, are sent from and accepted by ports in the blocked state.

In 802.1D, designated ports will forward packets even if the peer port at the neighbor is in the blocking state. Designated ports forward packets since there may be workstations on the corresponding Ethernet segment which may need to receive the packets. Simply adopting the 802.1D standard may result in modest reductions of LSP flooding. In this embodiment, however, customized BPDUs are used.

FIG. 11 shows the structure of exemplary customized BPDU 1100 in accordance with this embodiment. Note that, in this embodiment, links are point-to-point type. BPDU comprises standard BPDU fields 1102 and port transmission mode field 1103. Port transmission mode field 1103 functions in substantially the same way as port transmission mode field 908 in FIG. 9, described above. Thus, port transmission mode field 1103 indicates whether the sending port is in transmitting or non-transmitting mode. Ports are initially in transmitting mode. Ports in the blocked state, as determined by the spanning-tree protocol, are put in non-transmitting mode. Root ports are put in transmitting mode. The transmission mode of a designated port is determined by the transmission mode of its peer port. If the peer port is in transmitting mode, then the designated port will also be in transmitting mode. If the peer port is in non-transmitting mode, then the designated port will also be in the non-transmitting mode. A node will forward LSP updates over a port in transmitting mode. A node will not forward LSP updates over a port in non-transmitting mode. Note that, when in non-transmitting mode, bearer packets as well as other IS-IS messages, such as hello messages, are still transmitted over the link. The blocking applies only to LSP, CSNP, and PSNP messages.

The 802.1D standard identifies additional states for a port, such as disabled, listening, and learning. In one implementation of this embodiment, those states are ignored. In another implementation of this embodiment, if the port is in listening or learning state, then the port is put in transmitting mode. A port is in the disabled state if it is administratively disabled, in which case the disable link is not considered as part of the network.

In yet another embodiment of the invention, a flow-through mesh group is created which comprises the combination of multiple, different spanning trees, where, preferably, each has a different root. Combining two or more different spanning trees allows for greater reliability in the event of node or link failure since it is less likely that a failure will affect multiple spanning trees than a single spanning tree. Thus, while a spanning tree affected by a failure is regenerating, the one or more other spanning trees can continue distributing LSP updates. The more spanning trees a flow-through mesh group uses, the greater the reliability, but also the greater the drain on network resources. When choosing the number of spanning trees for a flow-through mesh group in a network, this balance should be considered.

Multiple operational modes are possible for a multi-spanning-tree flow-through mesh group. One mode of operation is the integrated mode of operation. In the integrated mode of operation, the n different spanning trees are determined based on the n highest-priority nodes in the network. As the nodes of the network exchange FTMGS messages, the nodes form n spanning trees where the first spanning tree has its root at the node with the highest priority, the second spanning tree has its root at the node with the second-highest priority, and so forth. In one implementation, for example, if (i) the network is fully connected, (ii) link costs are the same for all links, and (iii) each node is administratively configured to set up a flow-through mesh group of n spanning trees, then FTMGS message such as FTMGS message 900 of FIG. 9 can be used without further modification since each node will get an FTMGS message from every other node and will be able to determine the n nodes with highest priorities to set-up n spanning trees. In other implementations, if, for example, the network is highly, but not fully, connected or where path costs are variable, then appropriate fields are added to FTMGS messages.

FIG. 12 shows the structure of exemplary FTMGS message 1200 for a 2-spanning-tree FTMG in integrated mode. The fields of FTMGS message 1200 are substantially similar to the fields of FTMGS message 900 of FIG. 9, with some fields repeated, in particular, those fields necessary to identify the second spanning tree. Fields in FTMGS message 1200 with names and/or labels (with a different prefix) similar to names and/or labels of fields in FTMGS message 900 perform substantially the same function as the fields in FTMGS message 900. Thus, FTMGS message 1200 has (i) root 1 identifier field 1205 and root 2 identifier field 1211, as well as (ii) root 1 priority field 1206 and root 2 priority field 1212, (iii) originating node's path cost to root 1 field 1207 and originating node's path cost to root 2 field 1213, and (iv) port transmission mode (for spanning tree) 1 field 1208 and port transmission mode (for spanning tree) 2 field 1214. In general, the FTMGS message for an n-spanning-tree flow-through mesh group would have n root identifier fields, n root priority fields, n node-to-root-path-cost fields and n port-transmission-mode fields.

A receiving node can determine the number of spanning trees by analyzing the FTMGS message fields, or that number can be selected administratively. The number of spanning trees in a particular flow-through mesh group can also be indicated by optional spanning-tree-count field 1210 (in this case, 2), which did not appear in FTMGS message 900. Spanning-tree-count field 1210 can be particularly useful where the flow-through mesh group has a large number of spanning trees and the corresponding FTMGS messages are broken up into multiple packets. It should be noted that any other message-reconstruction techniques may be used instead. Spanning-tree-count field 1210 is also useful in case of configuration mismatch, where not all nodes agree on the number of spanning trees that the flow-through mesh group should comprise. Configuration mismatch can result from an administrative oversight. The mismatch can be corrected by having the node with the highest priority set the spanning-tree count for the network.

If a root node in an integrated-mode n-spanning-tree mesh group fails, then the node with the $(n+1)^{th}$ highest priority will become the root of the $n^{th}$ spanning tree. In the integrated mode, the $(n+1)^{th}$ priority node will become a new root regardless of which of the n highest-priority nodes fails. In some situations, an administrator may want more flexible control in such, or other topology-changing, situations.

A second mode of operation for a multi-spanning-tree flow-through mesh group is the independent mode of operation. In the independent mode, each spanning tree is maintained separately from the other spanning trees. This is similar to the way layers work in graphical programs, where each layer can be developed and maintained separately, but then all the layers are combined into one picture for viewing or printing. The independent mode allows nodes to have different priorities on different spanning trees, thereby allowing greater flexibility in flow-through mesh group design. For example, if a network spans England, France, and Germany, then the network administrator may want to have three spanning trees, each with a root in a different country. The independent mode lets the administrator configure a first spanning tree with the highest-priority nodes in England, a second spanning tree with the highest-priority nodes in France, and a third spanning tree with the highest-priority nodes in Germany. Thus, if the root node of the second spanning tree fails, then the new root of that spanning tree will likely stay in France, since the second spanning tree has its highest-priority nodes in France.

Although a flow-through mesh group operating in independent node can use the same FTMGS message structure as a corresponding FTMG operating in integrated mode would, there is a benefit to adding the various originating node's priority levels for the various corresponding spanning trees. Including the originating node's various priority levels allows the priority levels to be used in determining a link's directionality on a corresponding spanning tree where the two nodes connected by the link have the same path cost to the root port of the corresponding spanning tree.

FIG. 13 shows the structure of sample FTMGS message 1300 for a 2-spanning-tree FTMG operating in independent mode. FTMGS message 1300 is similar to FTMGS message 1200 of FIG. 12, with similarly named and labeled (though with a different prefix) elements referring to similar elements. Aside from fields similar to those in FTMGS message 1200, FTMGS message 1300 has multiple instances of originating-node-priority fields. Thus, FTMGS message 1300 has originating node priority 1 field 1303 and originating port priority 2 field 1315. In general, the FTMGS message for an n-spanning tree flow through mesh group in independent mode would have n root identifier fields, n root priority fields, n node-to-root-path-cost fields, n originating-node-priority fields, and n port-transmission-mode fields.

In both modes, each spanning tree is set up separately, using that spanning tree's particular parameters. After the spanning trees are set up, the spanning trees work together to transmit LSP messages. A port whose transmission mode for any spanning tree is transmitting, will forward LSP packets. Thus, although a particular port may be classified as transmitting on one spanning tree and non-transmitting on other spanning trees, that particular port will be forwarding LSP packets for the flow-through mesh group. If a port is classified as non-transmitting on all corresponding spanning trees, then that port will not forward LSP packets for the flow-through mesh group. Thus, the port's cumulative transmission mode is (1) transmitting if any of its corresponding transmission modes is transmitting and (2) non-transmitting if all of its corresponding transmission modes are non-transmitting. Note that a flow-through mesh group includes the links whose ports' cumulative transmission mode is transmitting mode, but not those links whose ports' cumulative transmission mode is in non-transmitting mode.

In setting up some multi-spanning-tree flow-through mesh groups, it may be beneficial to modify the spanning tree set-up process to enhance path diversity. Increasing path diversity should help increase network robustness. Path diversity can be increased by having nodes avoid, where possible, selecting the same port as the root port for multiple spanning trees.

Figure 14:
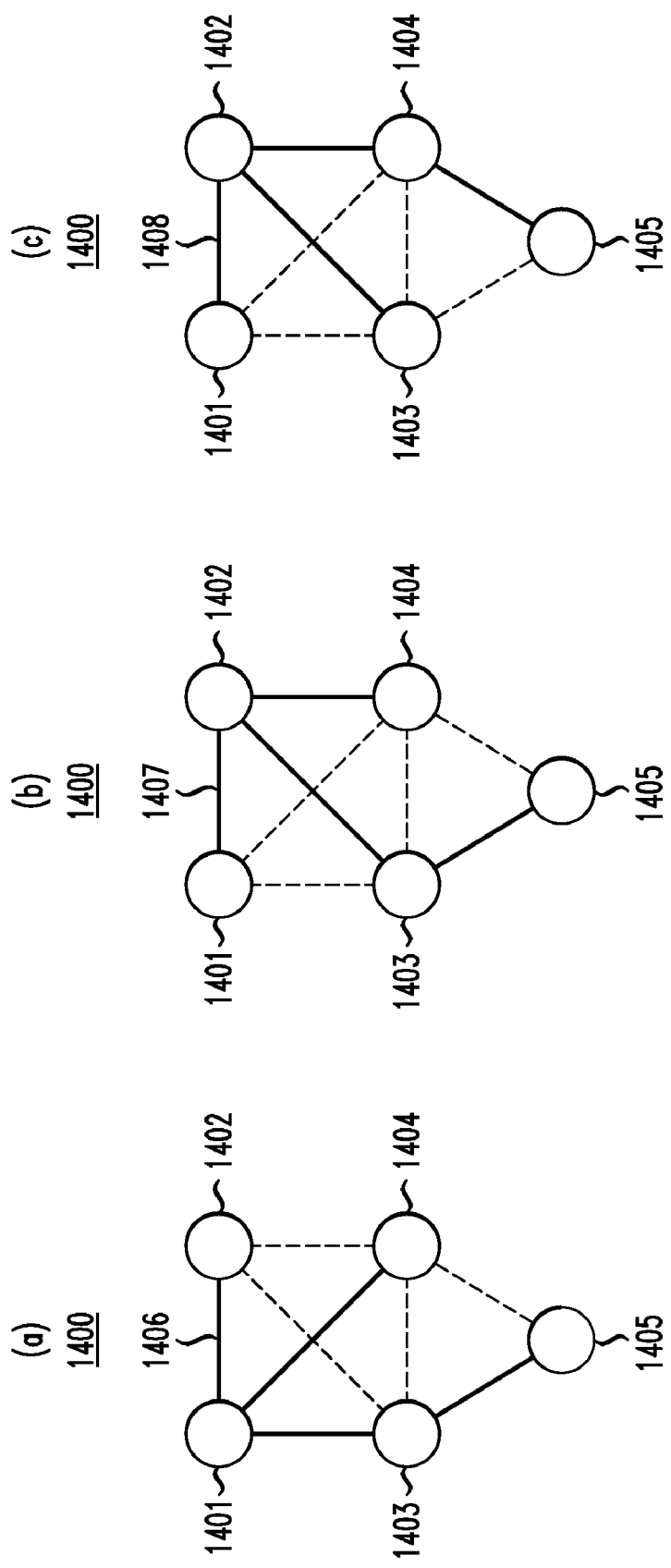
FIG. 14 show an exemplary highly connected network in accordance with an embodiment of the present invention.

FIG. 14 shows exemplary highly connected network 1400. Network 1400 comprises interconnected nodes 1401, 1402, 1403, and 1404, as well node 1405, which is linked only to nodes 1403 and 1404. All the links have the same cost in network 1400. Supposing that node priority follows node label in forming spanning trees, then the first spanning tree would be spanning tree 1406 of FIG. 14(*a*) with a root at node 1401, where the bold lines represent the links of spanning tree 1406. A second spanning tree formed using integrated mode would be spanning tree 1407 of FIG. 14(*b*) with a root at node 1402. As can be seen, in both spanning tree 1406 and spanning tree 1407, node 1405 connects to the root via node 1403 since node 1403 has a higher priority than node 1404, while its path cost to the root is the same as node 1404's path cost. If, however, node 1405 used path diversity, then, once the port connected to node 1403 became part of a spanning tree, node 1405 would avoid using it, and, instead, node 1405 would connect to second-spanning-tree root 1402 via node 1404, as seen in FIG. 14(*c*), where spanning tree 1408 is the resultant spanning tree. Path diversity may also be used in multi-spanning-tree flow-through mesh groups in independent mode.

It should be noted that current implementations of the IS-IS protocol support two levels of network operation: Level 1 and Level 2. Embodiments of the invention have been described without reference to IS-IS levels because the invention does not depend on specific protocol-implementation details such as levels. Embodiments of the invention may be designed to work on any combination of levels of a network.

Embodiments of the invention have been described in reference to the IS-IS protocol, RFC 2973, and the IEEE 802.1D standard. The invention is not limited to the frameworks described in those systems. Alternative embodiments of the invention utilize alternative frameworks and are not necessarily compatible with the above frameworks.

Embodiments of the invention have been described where designations of ports as upstream or downstream depend on the results of a comparison of one or more of: path cost to the root from the respective node, designated priority of the respective node, and the identification number of the respective node. In alternative embodiments, the results of comparisons are used in reverse order (e.g., higher identification number gets upstream designation). In alternative embodiments, other and/or additional factors are used to determine upstream/downstream designations.

As used herein, the term "root port" is used as a shorthand label for the downstream port of a non-root node that is connected to the least-cost path for the non-root node to the root node of a corresponding spanning tree. As such, references herein to designating a port as a root port do not require a separate labeling of the root port as a root port by the non-root node. Such designating can consist, for example, of identifying the root port as a downstream port set to be in transmitting mode. The term "non-root port(s)" refers to one or more other ports of the non-root node that are not connected to the least-cost path to the root node of the corresponding spanning tree. Root ports are downstream, while non-root ports may be either downstream or upstream.

Embodiments of the invention have been described where path cost is calculated based on the number of hops in a path. In one alternative embodiment, path cost is calculated based at least on available link bandwidth.

Embodiments of the invention have been described where flow-through mesh group set-up messages have particular structures. As would be appreciated by one of ordinary skill in the art, alternative implementations may vary the order and various details of the fields described. Such variations include adding, combining, breaking up, or removing fields and/or field descriptions. For example, fields may be omitted if the information conveyed therein is available to a receiving node from another source.

As used herein in reference to data packets and a corresponding item and unless otherwise indicated, the term "identify" and its variants mean that the data packet either (i) itself contains information identifying the item or (ii) contains information that, in conjunction with processor-accessible information located outside the data packet, is sufficient to identify the item.

References herein to the verb "to set" and its variations in reference to values of fields do not necessarily require an active step and may include leaving a field value unchanged if its previous value is the desired value. Setting a value may nevertheless include performing an active step even if the previous or default value is already the desired value.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. A first node for a network comprising a plurality of nodes interconnected by a plurality of links, the plurality of nodes comprising the first node, wherein:
    (a) the first node is configured to be part of a flow-through mesh group (FTMG) including the plurality of nodes of the network and a subset of the plurality of links of the network, wherein at least one link of the network is not part of the flow-through mesh group;
    (b) each node of the network comprises one or more ports, wherein:
        (1) each port is configured to connect via a link to a peer port at an other node of the network;
        (2) each port has a first transmission mode; and
        (3) the first transmission mode is one of transmitting mode and non-transmitting mode; and
    (c) the first node is configured to:
        (1) receive, at a first port of the first node, an FTMG set-up message from the first port's peer port, wherein the FTMG set-up message identifies:
            a root node of a first spanning tree for the network; and
            the first transmission mode of the peer port; and
        (2) set the first transmission mode of the first port based on at least one of (i) the identified first transmission mode of the peer port and (ii) the identified root node of the first spanning tree.

2. The first node of claim 1, wherein the first node is further configured to transmit, from each port of the first node, an FTMG set-up message to the port's peer port, wherein the FTMG set-up message identifies:
    a root node of the first spanning tree for the network; and
    the first transmission mode of the port.

3. The first node of claim 2, wherein the first node is configured to intermittently transmit FTMG set-up messages from each port to its peer port.

4. The first node of claim 1, further comprising at least one port configured to connect to a peer port at a node external to the network.

5. The first node of claim 1, wherein:
    the transmission mode of a port of the first node indicates whether the port sends and receives link-state packets (LSPs); and
    the port sends and receives bearer traffic without regard to the port's transmission mode.

6. The first node of claim 1, wherein the FTMG set-up message is a modified IEEE 802.1D-standard bridge protocol data unit (BPDU) modified to identify the first transmission mode of the peer port.

7. The first node of claim 1, wherein:
    each node of the network has a first priority level; and
    the FTMG set-up message further identifies:
        the other node of the network; and
        the first priority level of the identified root node of the first spanning tree;
    the first node determines a root node for the first spanning tree based on at least the first priority level of the identified root node of the first spanning tree.

8. The first node of claim 1, wherein the first node is further configured to:
    determine a first least-cost path to a root node of the first spanning tree;
    designate a first root port for the first node, wherein the first root port is the port connected to the determined first least-cost path;
    set the first transmission mode of the first root port to transmitting mode; and
    designate a first set of one or more non-root ports of the first node, wherein each non-root port in the first set is not the first root port.

9. The first node of claim 8, wherein the first node is further configured to:
    determine the directionality of each non-root port in the first set, where the directionality is one of upstream and downstream;
    set the transmission mode of each downstream non-root port to non-transmitting mode;
    set the transmission mode of each upstream non-root port to match the transmission mode of the upstream non-root port's peer port.

10. The first node of claim 8, wherein the first node is further configured to:
    determine a new first least-cost path to the root node of the first spanning tree in response to new received network status information;
    then designate a new first root port for the first node, wherein the new first root port is the port connected to the determined new first least-cost path;
    set the first transmission mode of the new first root port to transmitting mode; and
    designate a new first set of one or more non-root ports, wherein each non-root port in the new first set is not the new first root port.

11. The first node of claim 1, wherein:
    the FTMG set-up message further identifies:
        a root node of a second spanning tree for the network, different from the first spanning tree; and
        a second transmission mode of the peer port, wherein the peer port's second transmission mode corresponds to the second spanning tree;

the first port has a second transmission mode, wherein the first port's second transmission mode corresponds to the second spanning tree; and the first port's cumulative transmission mode is (1) transmitting mode if any of its corresponding transmission modes is transmitting mode and (2) non-transmitting mode if all of its corresponding transmission modes are non-transmitting modes.

12. The first node of claim 11, wherein:

each node of the network has a first priority level;

the FTMG set-up message further identifies:
- the other node of the network;
- the first priority level of the identified root node of the first spanning tree; and
- the first priority level of the identified root node of the second spanning tree;

the network node determines a root node for the first spanning tree based on at least the first priority of the identified root node of the first spanning tree; and the network node determines a root node for the second spanning tree based on at least the first priority of the identified root node of the second spanning tree.

13. The first node of claim 11, wherein:

each node of the network has a first priority level and a second priority level independent of the first priority level;

the FTMG set-up message further identifies:
- the other node of the network;
- the first priority level of the identified root node of the first spanning tree; and
- the second priority level of the identified root node of the second spanning tree;

the network node determines a root node for the first spanning tree based on at least the first priority level of the identified root node of the first spanning tree; and the network node determines a root node for the second spanning tree based on at least the second priority level of the identified root node of the second spanning tree.

14. The first node of claim 11, wherein the first node is configured to implement a path-diversity algorithm to determine root ports corresponding to respective spanning trees.

15. The first node of claim 11, wherein the plurality of links of the flow-through mesh group are the links of the network that are between ports whose cumulative transmission mode is transmitting mode.

16. A computer-implemented method for a first node in a network, wherein:

the network has a plurality of nodes interconnected by a plurality of links;

the plurality of nodes includes the first node;

the first node is configured to be part of a flow-through mesh group (FTMG) including the plurality of nodes of the network and a subset of the plurality of links of the network, wherein at least one link of the network is not part of the flow-through mesh group; and each node of the network has one or more ports, wherein:
- each port is configured to connect via a link to a peer port at an other node of the network;
- each port has a first transmission mode; and
- the first transmission mode is one of transmitting mode and non-transmitting mode, the method comprising:

the first node receiving, at a first port of the first node, an FTMG set-up message from the first port's peer port, wherein the FTMG set-up message identifies:
- a root node of a first spanning tree for the network; and
- the first transmission mode of the peer port; and the first node setting the first transmission mode of the first port based on at least one of (i) the identified first transmission mode of the peer port and (ii) the identified root node of the first spanning tree.

17. The method of claim 16, wherein:

the FTMG set-up message further identifies:
- a root node of a second spanning tree for the network, different from the first spanning tree; and
- a second transmission mode of the peer port, wherein the peer port's second transmission mode corresponds to the second spanning tree;

the first port has a second transmission mode, wherein the first port's second transmission mode corresponds to the second spanning tree; and the first port's cumulative transmission mode is (1) transmitting mode if any of its corresponding transmission modes is transmitting mode and (2) non-transmitting mode if all of its corresponding transmission modes are non-transmitting modes.

18. The method of claim 16, wherein:

each node of the network has a first priority level;

the FTMG set-up message further identifies:
- the other node of the network;
- the first priority level of the identified root node of the first spanning tree; and
- the first priority level of the identified root node of the second spanning tree; and the method further comprises:
- determining a root node for the first spanning tree based on at least the first priority of the identified root node of the first spanning tree; and
- determining a root node for the second spanning tree based on at least the first priority of the identified root node of the second spanning tree.

19. The method of claim 16, wherein:

each node of the network has a first priority level and a second priority level independent of the first priority level;

the FTMG set-up message further identifies:
- the other node of the network;
- the first priority level of the identified root node of the first spanning tree; and
- the second priority level of the identified root node of the second spanning tree; and the method further comprises:
- determining a root node for the first spanning tree based on at least the first priority level of the identified root node of the first spanning tree; and
- determining a root node for the second spanning tree based on at least the second priority level of the identified root node of the second spanning tree.

20. A non-transitory machine-readable medium, having encoded thereon program code for a first node of a network, wherein:

the network has a plurality of nodes interconnected by a plurality of links;

the plurality of nodes includes the first node;

the first node is configured to be part of a flow-through mesh group (FTMG) including the plurality of nodes of the network and a subset of the plurality of links of the network, wherein at least one link of the network is not part of the flow-through mesh group;

each node of the network has one or more ports, wherein:
- each port is configured to connect via a link to a peer port at an other node of the network;
- each port has a first transmission mode; and the first transmission mode is one of transmitting mode and non-transmitting mode; and when the program code is executed by a machine, the machine receives, at a first port of the first node, an FTMG set-up message from the first port's peer port, wherein the FTMG set-up message identifies:

a root node of a first spanning tree for the network; and the first transmission mode of the peer port; and sets the first transmission mode of the first port based on at least one of (i) the identified first transmission mode of the peer port and (ii) the identified root node of the first spanning tree.

* * * * *